United States Patent [19]

Ikeda et al.

[11] Patent Number: 5,451,284
[45] Date of Patent: Sep. 19, 1995

[54] SELF-MOBILE WORK VEHICLE MOVEABLE THROUGH PIPELINE AND METHOD AND APPARATUS FOR LINING INTERCONNECTING BRANCH PIPE USING THE VEHICLE

[75] Inventors: Shintaro Ikeda, Sagamihara; Toru Fukuzato, Yamato; Kensuke Sejima, Tokyo, all of Japan

[73] Assignee: Nippon Kokan Koji Kabushiki Kaisha, Yokohama, Japan

[21] Appl. No.: 168,077

[22] Filed: Dec. 14, 1993

[30] Foreign Application Priority Data

Dec. 25, 1992 [JP] Japan .................................. 4-357720
Jan. 18, 1993 [JP] Japan .................................. 5-21690

[51] Int. Cl.⁶ ............................................ B29C 63/36
[52] U.S. Cl. ............................... 156/247; 156/287; 156/344; 156/294; 156/423; 156/584; 138/97; 405/154
[58] Field of Search ...................... 405/154, 156, 184; 138/97; 156/287, 290; 60/427; 91/524; 156/247, 344, 294, 423, 584

[56] References Cited

U.S. PATENT DOCUMENTS

| | | | |
|---|---|---|---|
| 3,718,978 | 3/1973 | Van Koevering et al. | 405/154 |
| 3,930,439 | 1/1976 | Hunter | 91/524 |
| 4,712,376 | 12/1987 | Hadank et al. | 60/427 |
| 4,822,211 | 4/1987 | Shinoda et al. | 405/154 |
| 4,898,078 | 2/1990 | Gnoe et al. | 91/524 |
| 4,986,314 | 1/1991 | Himmler | 138/97 |
| 5,329,063 | 7/1994 | Endoh | 156/287 |

Primary Examiner—Randolph A. Reese
Assistant Examiner—Frederick L. Lagman
Attorney, Agent, or Firm—Kenjiro Hidaka

[57] ABSTRACT

An electrically remote-controlled intra-pipe work vehicle is hydraulically actuated and is adapted to work with a lining equipment for lining interior of a branch pipe interconnecting with the main pipe in which the vehicle is positioned. The vehicle has a self-clamping mechanism to securely anchor itself at a work site in the main pipe and a tool actuating mechanism for angularly positioning and actuating the lining equipment. The lining equipment includes a lining material anchoring hydraulic press for pressingly hold an end flange of a tubular lining material, which is made of a fabric impregnated with a thermosetting synthetic resin, by an arcuate pressing plate. A counter hydraulic press counteracts the pressing force of the lining material anchoring press. A sealing tube having an electric heater element imbedded therein is sealedly bonded to an end of the tubular lining material with a bonding agent having a low melting temperature. The lining material is forced into the branch pipe by a pressurized fluid and pressed against the inside wall of the branch pipe. Then, the lining material is heated by a heated pressurized fluid to be set hardened. Subsequently, electric current is provided to the heater element in the sealing tube so that the bonding agent is melted and the sealing tube is separated from the lining material.

4 Claims, 15 Drawing Sheets

SELF-MOBILE WORK VEHICLE MOVEABLE THROUGH PIPELINE AND METHOD AND APPARATUS FOR LINING INTERCONNECTING BRANCH PIPE USING THE VEHICLE

BACKGROUND OF THE INVENTION

1. Field of the Invention

The present invention pertains to a remote-controlled self-mobile work vehicle used for the inspection or repair of interior of a pipeline such as water pipe, sewer pipe or oil pipe and a method and an apparatus for lining inside wall of a branch pipe interconnecting with a main pipe of the pipeline system with a fabric coated or impregnated with a synthetic resin by using the work vehicle.

2. Description of the Prior Art

A self-mobile work vehicle, which is moveable through a pipeline, equipped with a TV camera, an inspection device, and/or work tools has conventionally been used in order to inspect a welded joint or any corrosion or repair inside of an underground pipeline such as water pipe, sewer pipe or oil pipe.

One type of such conventional self-mobile work vehicle employs an electric motor for the mobility.

Other type of conventional intra-pipeline work vehicle utilizes a pig body that is moved in a pipeline by a fluid pressure differential in the pipeline, as disclosed in U.S. Pat. No. 4,964,059 issued Oct. 16, 1990 to the parent company of the assignee of the present invention. This vehicle can be equipped with a TV camera, inspection apparatus and work tools, which are operable by an electric actuator or an air-operated actuator.

However, a self-mobile work vehicle must at times negotiate a pool of standing water, ascending slope, sinks or any other irregularities in the pipeline when it is moved through, for example, an underground water pipeline or sewer pipeline. In such a case, it is impossible to use any intra-pipeline work vehicle that is moved by a fluid pressure differential in the pipeline. On the other hand, in the case an electric motor is used for an intra-pipeline work vehicle, whether the motor is mounted on the vehicle for self-mobility or the vehicle is externally pulled with a cable, the size and power of the electric motor must inevitably be large in order to overcome the above mentioned adverse conditions. Therefore, it has been difficult to move a work vehicle or stop it at an exactly desired location in particularly a small diameter pipe. As a matter of course, a small diameter pipe accepts only a small size work vehicle therein, which can accommodate a small size electric motor having a small power. This situation even worsens when a small diameter pipeline has any physical irregularities, such as misalignment or dislocation of pipe joints, sinks formed from such physical irregularities or any sediments.

Various methods of lining synthetic resin on the inside surface of an existing water pipeline or sewer pipeline has been known. Such lining is conducted for the purpose of reinforcement, anti-corrosion treatment, stemming water leakage from inside or outside of the pipeline, or improvement of water flow in the pipeline. When external water leaks into an underground pipeline, one of the most probable inlets for the leaking water is a joint between the main pipe and an interconnecting branch pipe.

Japanese laid-open patent publication, no. 2-239920, dated Sep. 21, 1990, and Japanese laid-open patent publication, no. 3-130130, dated Jun. 3, 1991, both assigned to the assignee of the present invention, disclose methods and apparatuses for preventing water from entering into existing underground pipelines.

Now, a gist of the disclosure of Japanese laid-open patent publication 2-239920 will be explained in reference to FIG. 27.

An electric or pneumatic press 96 is mounted on a sled 95, which is moveable through a main pipe 52 by being pulled with a rope. A steel pressing plate 97, which is arcuately shaped in alignment with the curvature of the inside wall of the pipe 52, is fixedly attached on top of the press 96. A flexible tubular lining material 92, which is substantially made of synthetic resin having a wide expanded end 91, is inserted into a branch pipe 54 interconnecting with the main pipe 52. The expanded end 91 of the lining material is affixed onto the pressing plate 97 with a ring 91a made of synthetic resin and tied to the expanded end 91. Then, the press 96 is actuated and the expanded end 91 of the lining material 92 is pressed against the inside wall of the main pipe 52 together with the ring 91a at the periphery of the mouth of the branch pipe 54. Then, the lining material 92 is filled with a fluid so that it is expanded and pressed against the inside wall of the branch pipe 54 by the fluid pressure. Subsequently, a high temperature fluid, such as hot water, is circulated through inside the lining material 92 so that the lining material 92 is set hardened. Thus, the inside wall of the branch pipe 54 is lined with the synthetic resin.

A pressing force of about 0.3 kgf/cm$^2$ has to be normally applied onto the expanded end 91 of the lining material 92 and the ring 91a against the wall of the main pipe 52 in order to make the thickness of the end part the same as that of the lining material 92 pressed onto the inside wall of the branch pipe 54. This force is translated to a total pressing force of more than 200 kgf applied to the entire pressing plate 97. Furthermore, the pressing force must be evenly applied to the total area of the pressing plate 97. However, it has been difficult to obtain a evenly distributed pressing force of a sufficient strength in a small or medium diameter pipe. This is because only a single or a few electrically-operated or air-operated presses can be utilized because of a limited space in the pipe.

Furthermore, when an electrically-operated or air-operated press or an actuator is operated in a pipe under an adverse condition where water leakage or standing water is existent, or, even worse, the press or the actuator is covered with water or mud, problems such as electrical short-circuit or the machine failure is likely to occur and, thus, the work would not be performed efficiently.

SUMMARY OF THE INVENTION

In view of the above mentioned situation, a first object of the present invention is to provide a remote-controlled self-mobile intra-pipe work vehicle of a compact size having a strong driving power, and yet, moveable and efficiently workable in a small-size main pipe even under an adverse condition where water or mud may be present.

A second object of the present invention is to provide a method and an apparatus for internally lining an interconnecting branch pipe and the main pipe at the periphery of the mouth of the branch pipe using the above mentioned work vehicle.

A third object of the present invention is to provide a method and an apparatus for exerting a sufficient and even pressing force onto an end flange of a tubular lining material, which will internally line the branch pipe, to the inside wall of the main pipe at the periphery of the mouth of the branch pipe.

A fourth object of the present invention is to provide a method and an apparatus for effectively sealing the tubular lining material with a sealing element for internally lining the branch pipe and removing the sealing element easily from the lining material after the lining work has been completed.

In order to achieve the above first object, an intra-pipe work vehicle of the present invention has a housing, an oil pressure generating unit, a system driving unit, and an oil flow control valve block. The oil pressure generating unit includes an electric motor, an internal-gear type oil pressure pump driven by the electric motor, and an oil tank. The system driving unit includes a mobile mechanism for bi-directionally moving the work vehicle, a vehicle anchoring mechanism for self-clamping the work vehicle against the inside wall of the pipe so that the work vehicle is securely anchored at a work site in the pipe, and a tool actuating mechanism for rotating and actuating a work tool. The oil flow control valve block includes a plurality of solenoid-operated oil flow control valves.

The mobile mechanism includes a bi-directional hydraulic motor and three pairs of wheels driven by the hydraulic motor via a transmission gear train. The vehicle anchoring mechanism is a hydraulic press having an actuating member that can be upwardly extended and pressed against the inside wall of the pipe so that the work vehicle is self-clamped by and between the actuating member and the wheels. The tool actuating mechanism includes a second bi-directional hydraulic motor and a tool mount that can be bi-directionally rotated by the second hydraulic motor via a second gear train.

In order to achieve the second, the third and the fourth objects, the invention additionally provides a lining equipment that can be used with the work vehicle.

The lining equipment includes a mounting bracket that can be mounted on the rotatable tool mount of the work vehicle, a lining material anchoring hydraulic press fixedly mounted on the mounting bracket, a counter hydraulic press fixedly mounted on the mounting bracket, a lining tool holder having an arcuate press plate, which has a guide hole, and a guide tube. The lining tool holder is fixedly mounted on an actuating member of the lining material anchoring hydraulic press. The lining equipment further includes a tubular sealing part sealedly attached to the guide tube, a tubular flexible lining material having an end flange made of a fabric coated or impregnated with a thermosetting synthetic resin, a sealing tube having an electric heater element imbedded therein and sealedly bonded to an end of the tubular lining material with an adhesive having a low melting temperature, a means for supplying a pressurized fluid into the space enclosed by the guide tube and the sealing part, a means for supplying a heated pressurized fluid into the space enclosed by the guide tube and the sealing part, and a means for supplying electric current to the electric heater element imbedded in the sealing tube.

For the lining work, the lining material together with the sealing tube is inserted into the space enclosed by the guide tube and the sealing part through the guide hole of the arcuate press plate leaving the end flange on the arcuate press plate. The arcuate press plate presses the end flange against the inside wall of the main pipe about the mouth of the interconnecting branch pipe by extending the actuating member of the lining material anchoring hydraulic press. An actuating member of the counter hydraulic press, on the other hand, extends in the direction opposite from the extending direction of the actuating member of the lining material anchoring hydraulic press and also presses the inside wall of the main pipe. Then, the pressurized fluid is supplied into the space enclosed by the guide tube and the sealing part so that the tubular lining material together with the sealing tube is forced into the branch pipe, turned inside out therein, and the lining material is further pressed on the inside wall of the branch pipe. Subsequently, the heated pressurized fluid is supplied into the space enclosed by the guide tube and the sealing part so that the thermosetting synthetic resin of the lining material pressed on the inside wall of the branch pipe is set hardened. Further, electric current is provided to the electric heater element imbedded in the sealing tube in order to melt the adhesive by the heat generated from the heater element so that the sealing tube is separated from the lining material.

The above and other objects, features and advantages of the invention will become more clear from the following description taken in conjunction with the accompanying drawings.

Figure 1:
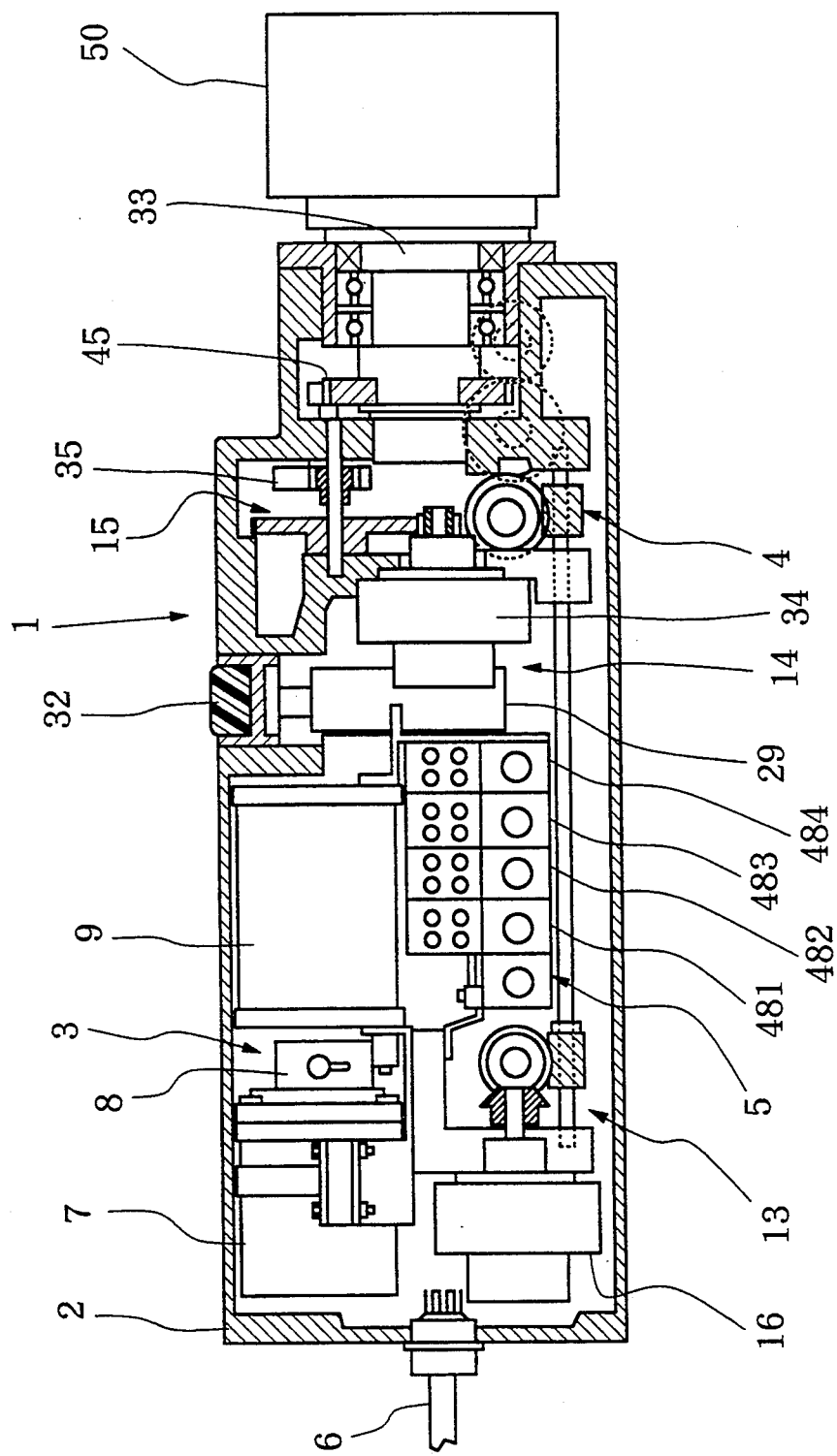
FIG. 1 is a side elevational partially sectional view showing a construction of a self-mobile work vehicle according to the present invention.
Figure 12:
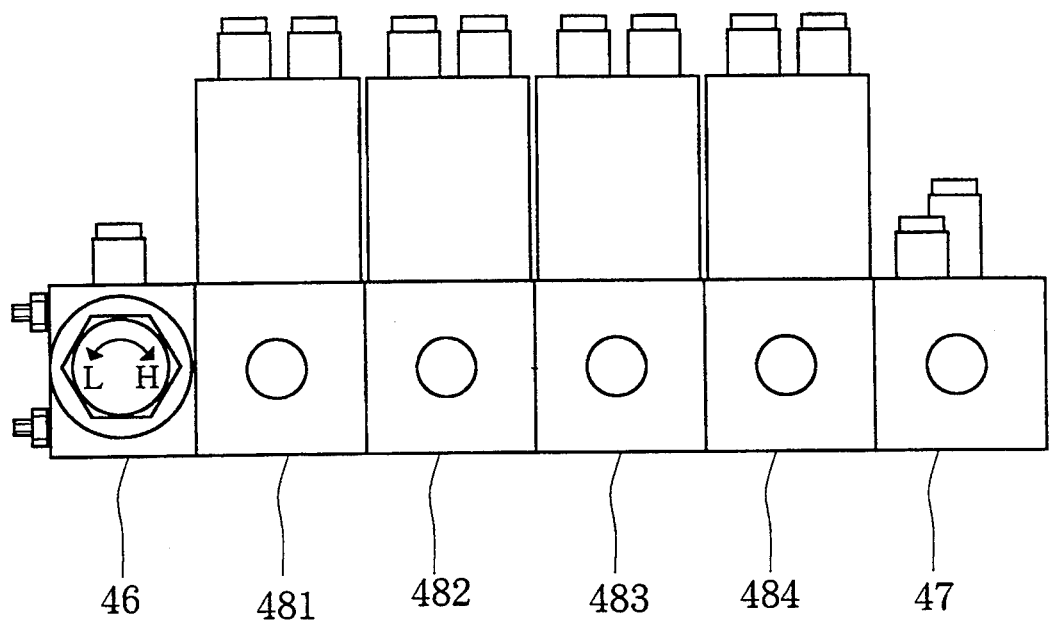
Figure 13:
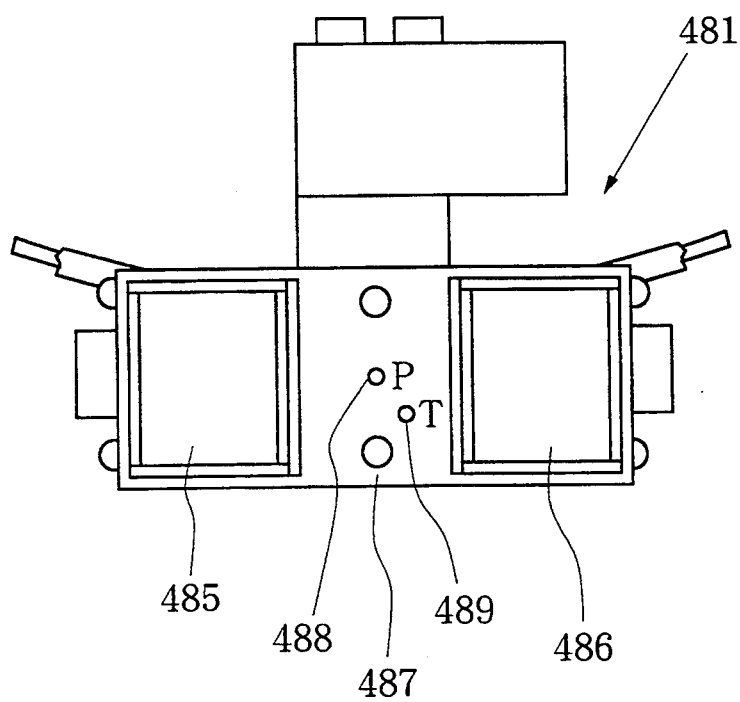
Figure 14:
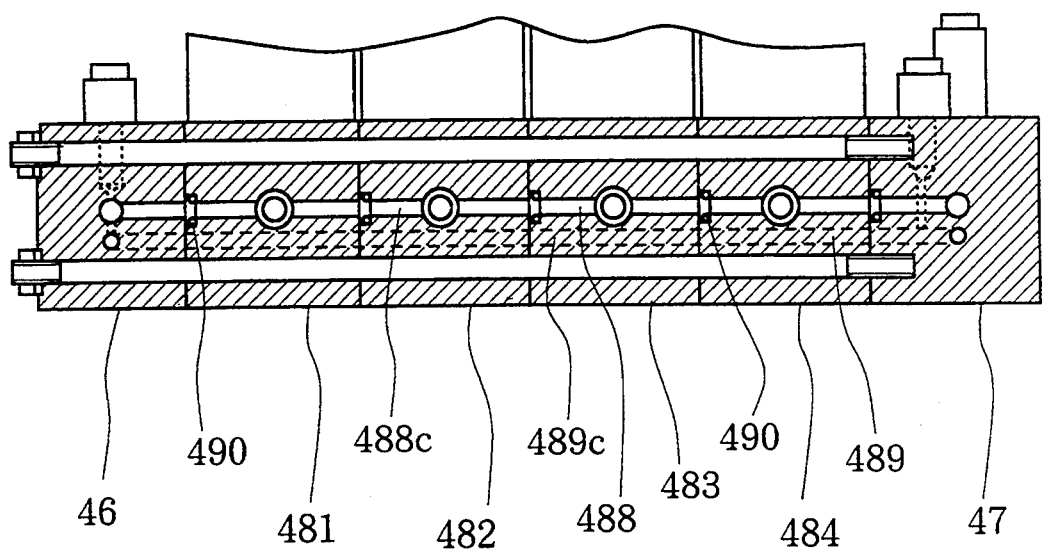
Figure 15:
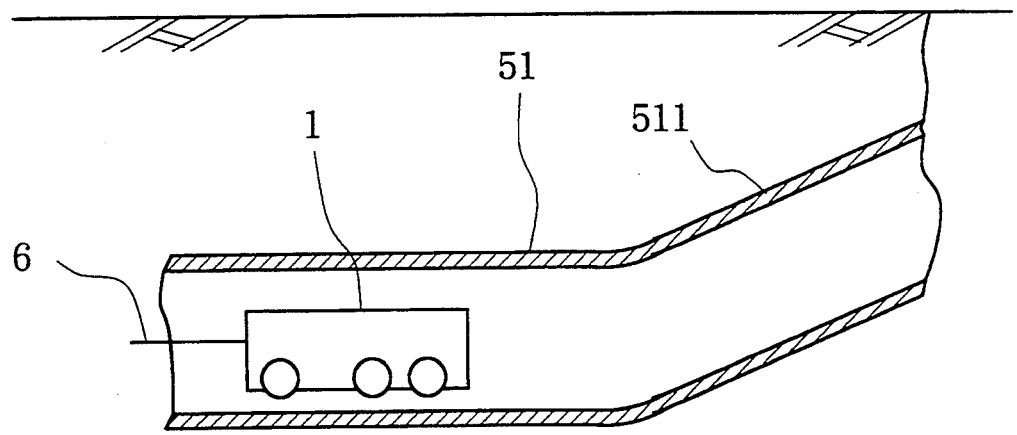
Figure 16:
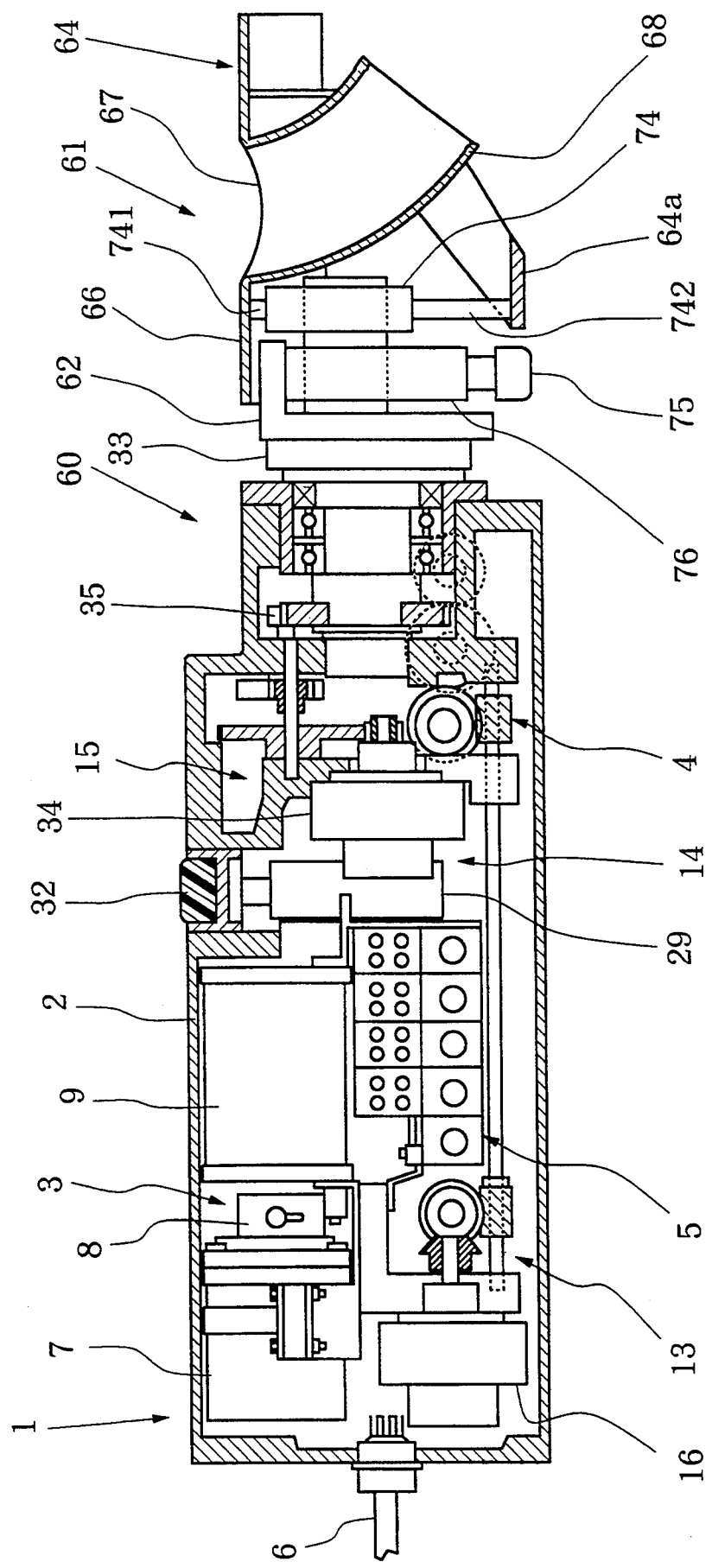
Figure 17:
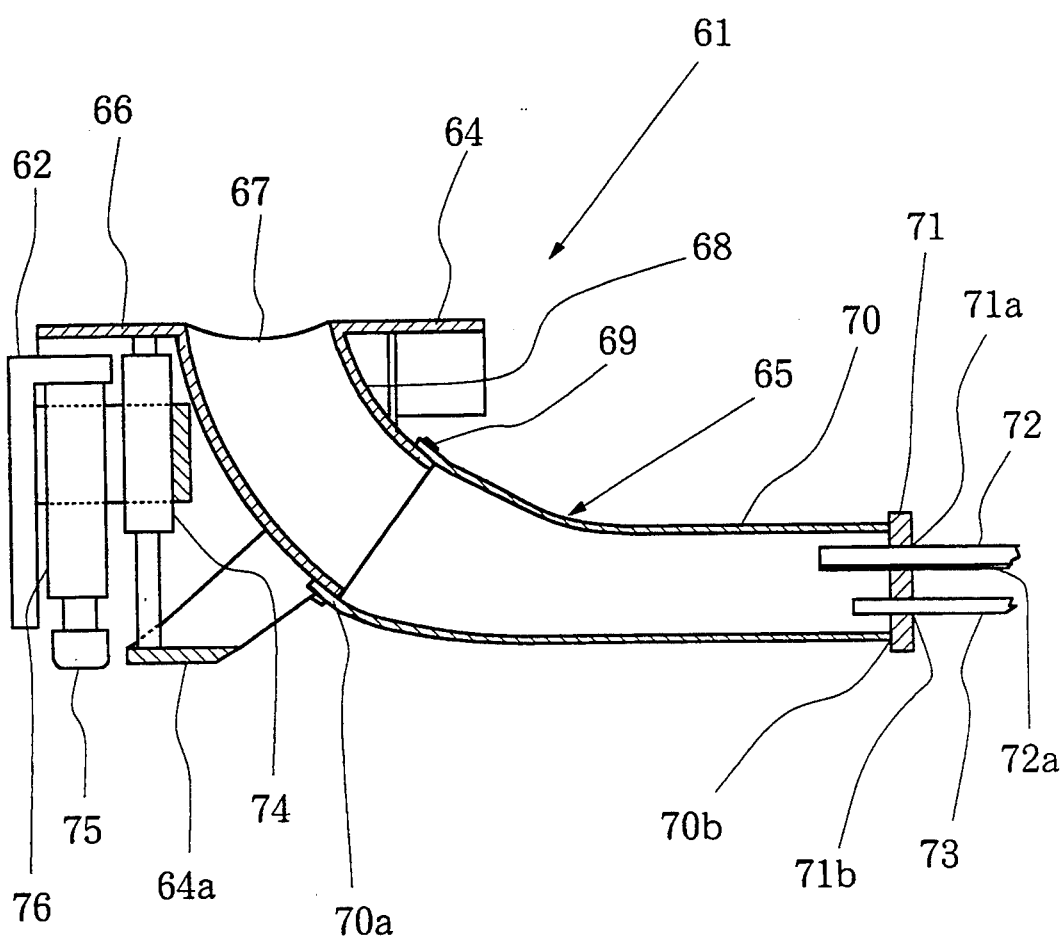
Figure 18:
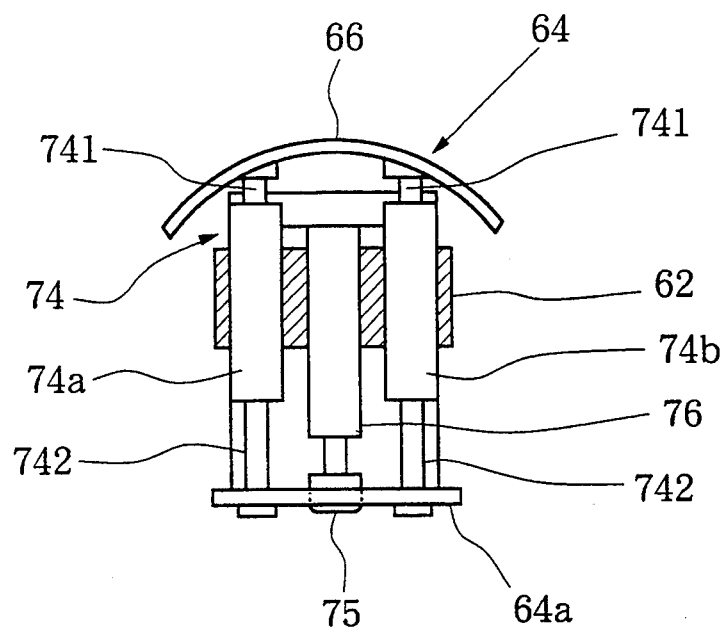
Figure 19:
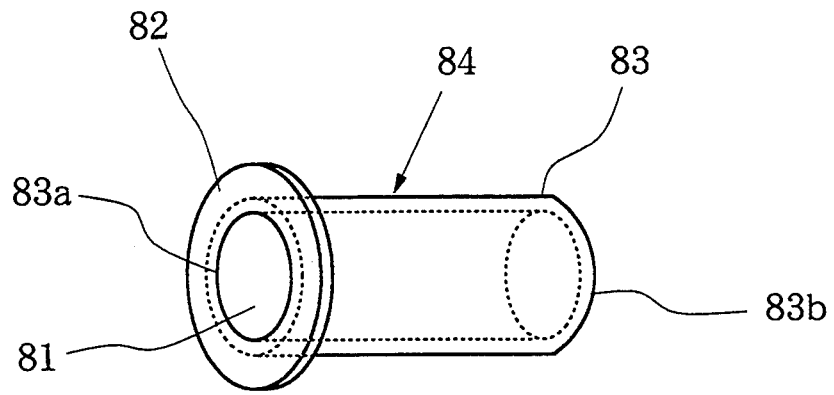
Figure 20:
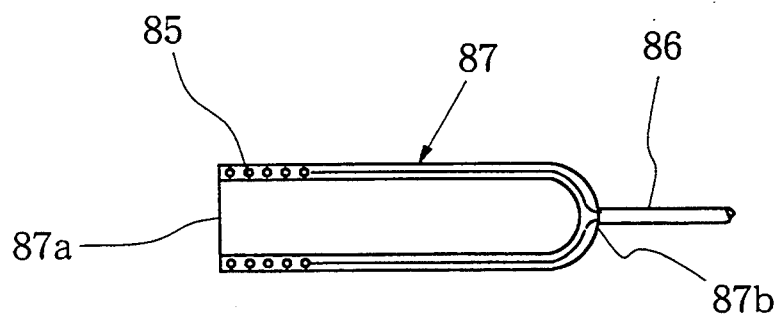
Figure 21:
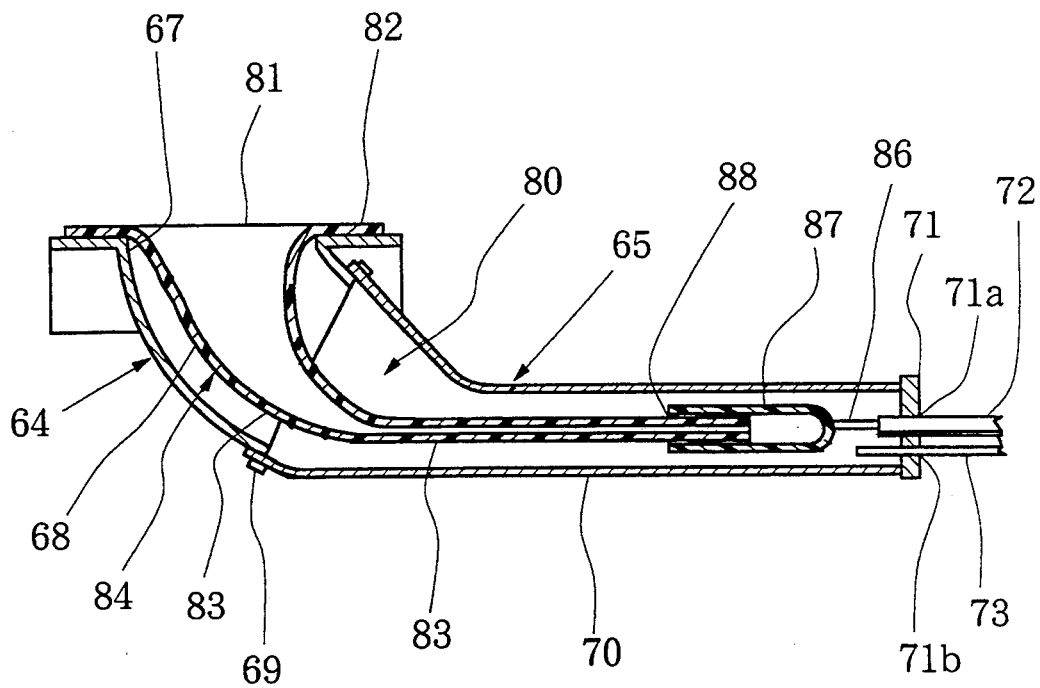
Figure 22:
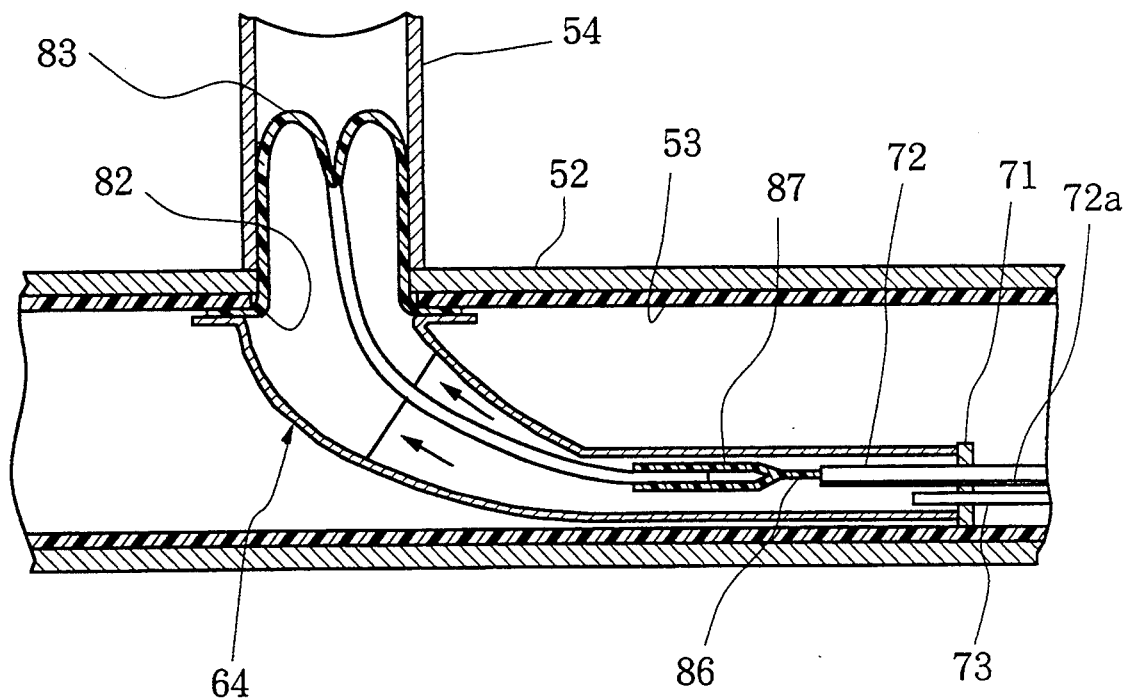
Figure 23:
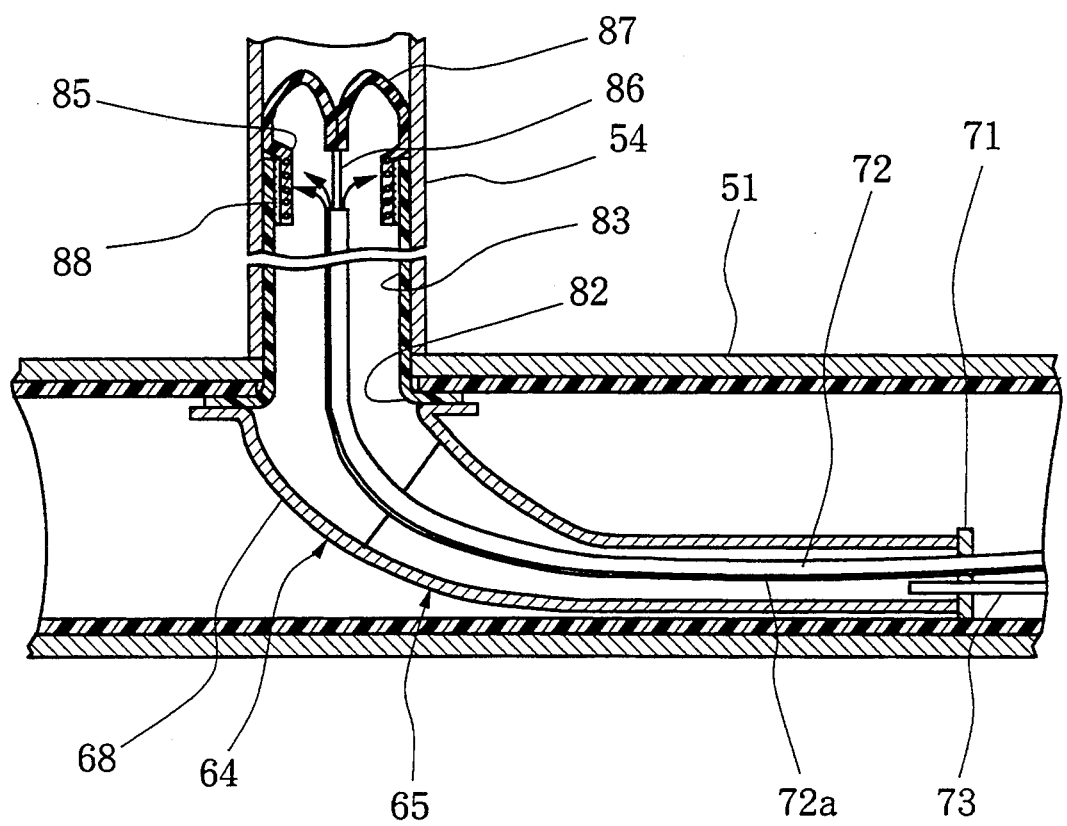
Figure 24:
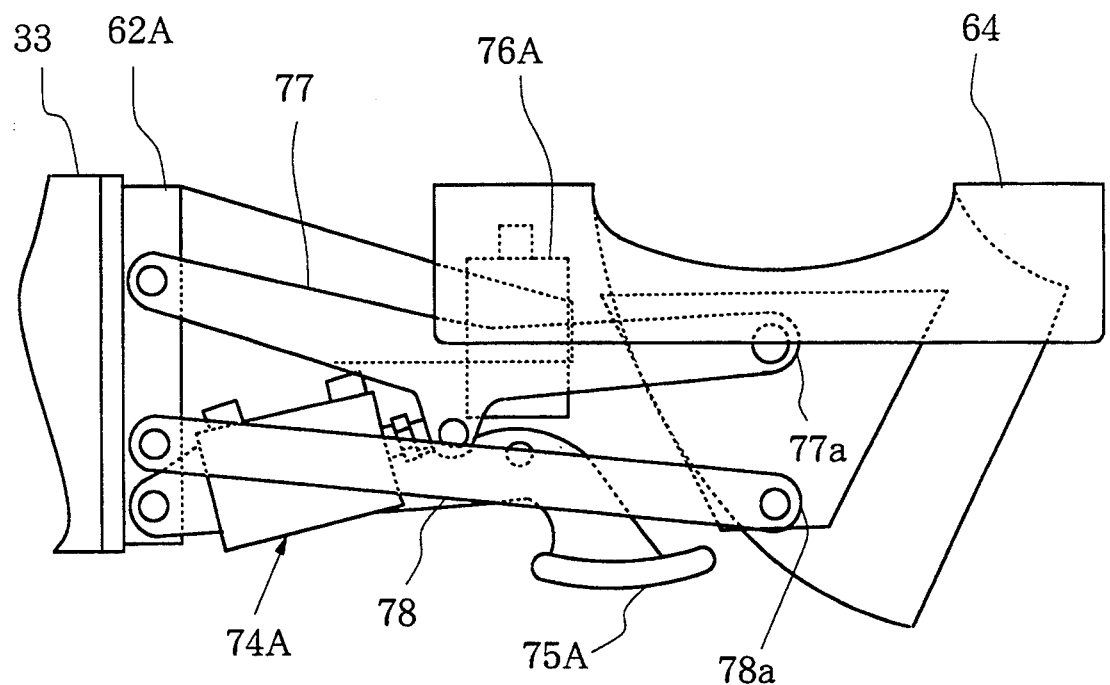
Figure 25:
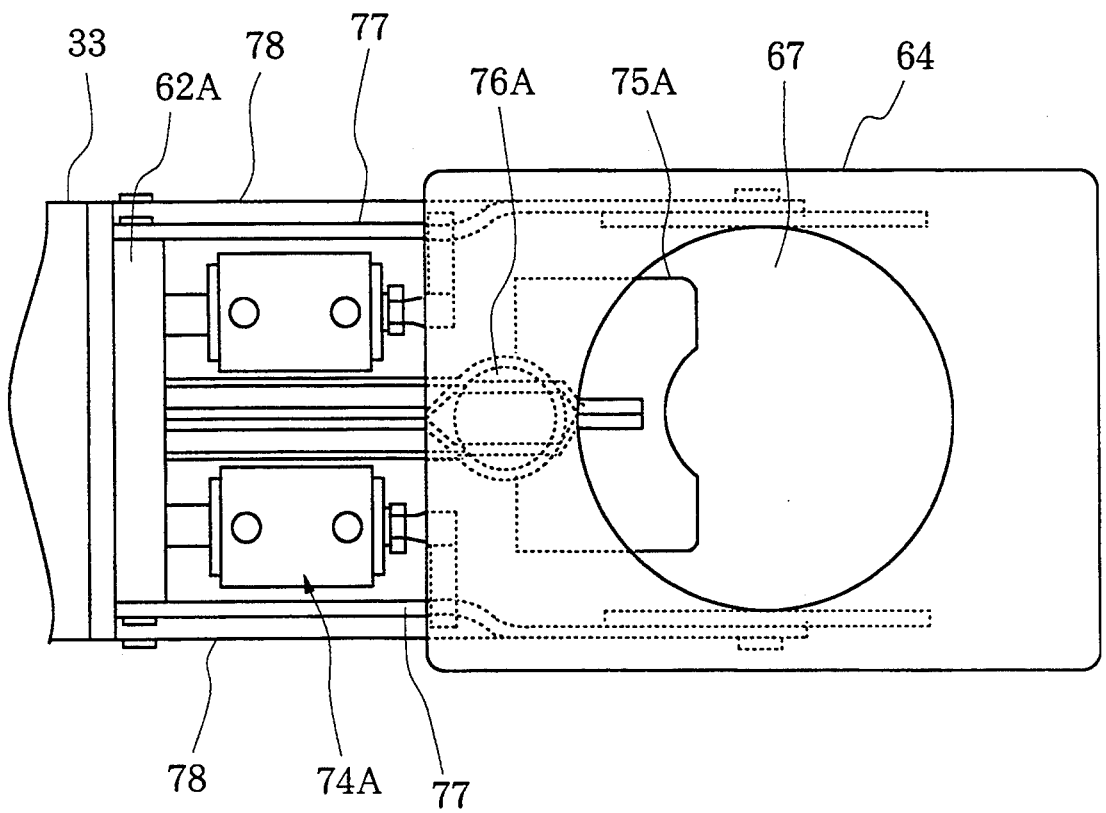
Figure 26:
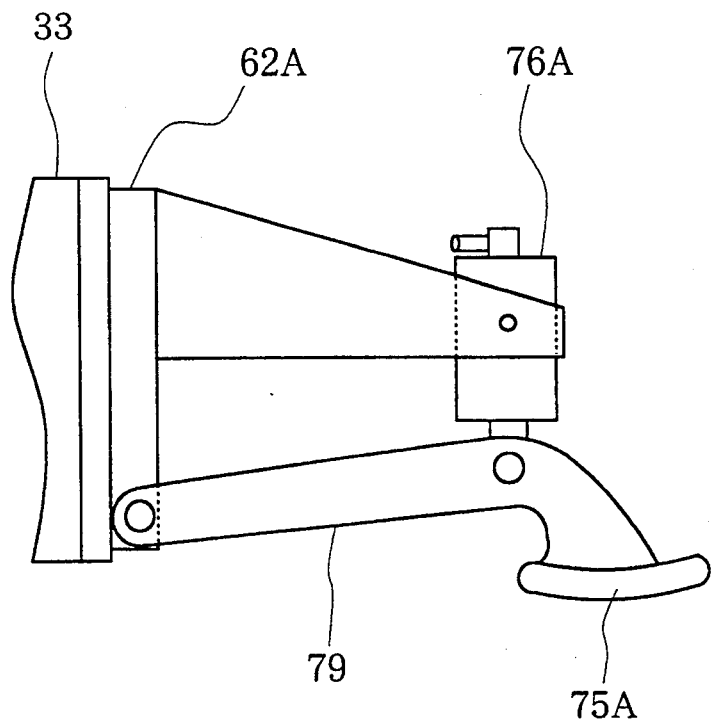
Figure 27:
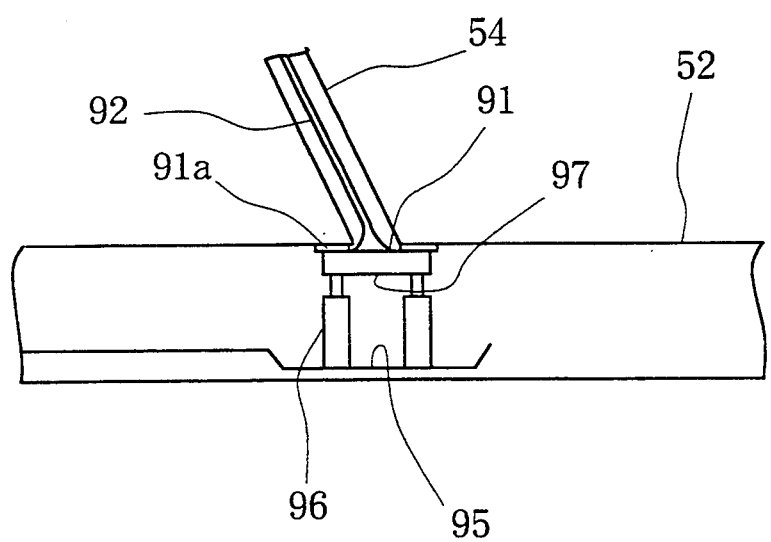

PIG. 12 is a side elevational view of an oil flow control valve block employed in the work vehicle shown in FIG. 1;

FIG. 13 is a front view of one of solenoid-operated oil flow control valves of the oil flow control valve block shown in FIG. 12;

FIG. 14 is a partially sectional side view of a part of the oil flow control valve block shown in FIG. 12;

FIG. 15 is a partially sectional view showing the work vehicle in an underground pipe;

FIG. 16 is a side elevational partially sectional view showing the work vehicle shown in FIG. 1 and a part of a lining equipment according to the present invention;

FIG. 17 is a partially sectional side view showing a part of the lining equipment according to the present invention;

FIG. 18 is a partially sectional front view showing a mounting bracket, a hydraulic press, a counter hydraulic press and a part of a lining tool holder, all employed in the lining equipment shown in FIG. 17;

FIG. 19 is a perspective view of a lining material used in the lining equipment;

FIG. 20 is a sectional view of a sealing tube used in the lining equipment;

FIG. 21 is a sectional view showing a part of the lining equipment;

FIG. 22 is a sectional view showing a main pipe, a branch pipe, and a part of the lining equipment, particularly showing a part of the lining material having been turned inside out and forced into the branch pipe;

FIG. 23 is another sectional view of the main pipe, the branch pipe, and a part of the lining equipment, particularly showing all of the lining material being pressed against an inside wall of the branch pipe;

FIGS. 24, 25 and 26 show a part of a lining equipment of an alternative embodiment according to the present invention; and FIG. 27 is a diagrammatic view of a prior known lining apparatus for lining a branch pipe of a pipeline system.

DETAILED DESCRIPTION OF THE PREFERRED EMBODIMENTS

Referring to FIG. 1, numeral 1 denotes a remote-controlled self-mobile work vehicle that is adapted to be moveable through a pipe of a pipeline system. Numeral 2 denotes a housing of the vehicle 1. The work vehicle 1 has, in the housing 2, an oil pressure generating unit 3 disposed in a rear section of the housing 2, a system driving unit 4, an oil flow control valve block 5 accommodated under the oil pressure generating unit 3. The oil pressure generating unit 3 includes an electric motor 7, an oil pressure pump 8 driven by the motor 7 and an oil tank 9 containing driving oil that is supplied to the oil pressure pump 8. The electric motor 7 is powered from an outside power supply (not shown) via an electric cable 6. The electric motor 7 is a compact dc motor that utilizes a rare-earth metal field magnet and has an excellent output-power/mass ratio. The oil pressure pump 8 is an internal gear hydraulic pump employing a ring gear and a pinion gear having involute teeth. Since the pump 8 does not require large quantity of oil displacement, the diameter of the pinion gear with respect to the diameter of the ring gear is made comparatively large, and a sufficient numbers of gear teeth are used in order to realize a minimized leakage, a large output pressure, and yet a compact size. The circular pitch ratio, which is also the ratio of the number of teeth, of the ring gear to the pinion gear is, for example, 24/18.

Figure 2:
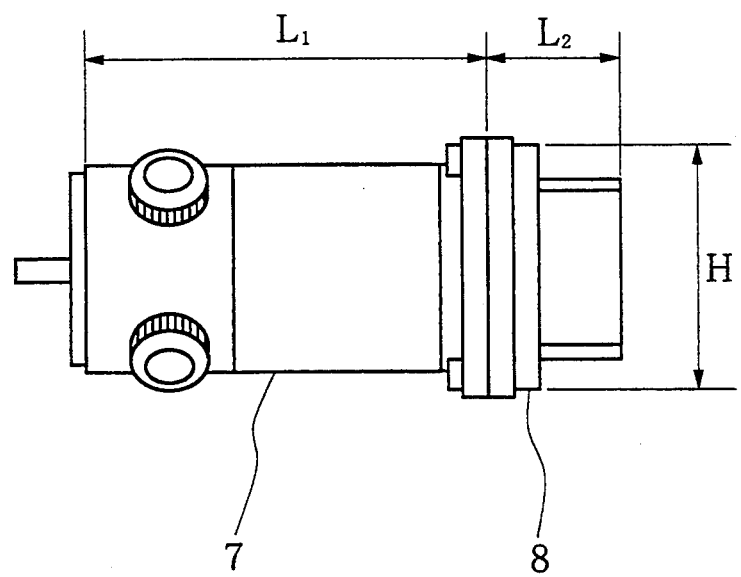
FIG. 2 is a side view showing an electric motor and an oil pressure pump employed in the work vehicle shown in FIG. 1.
Figure 3:
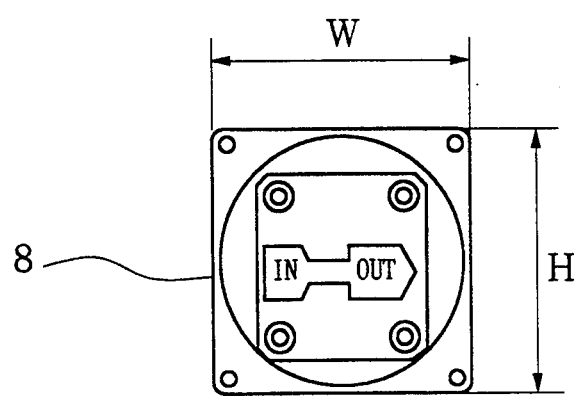
FIG. 3 is a front view of the oil pressure pump shown in FIG.2.

Reference is made to FIGS. 2 and 3. In minimizing the sizes of the electric motor 7 and the pump 8, the length $L_1$ of the electric motor 7 is made about 100 mm, and the length $L_2$, the height H and the width W of the pump 8 are made about 35 mm, 65 mm and 65 mm, respectively. Thus, the outside dimensions of the work vehicle 1 can be made small enough so that the vehicle 1 may be operated in a pipe having a nominal diameter of as small as 10".

Figure 4:
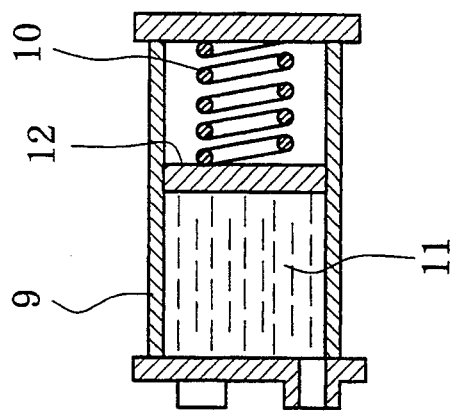
FIG. 4 is a sectional view of an oil tank employed in the work vehicle shown in FIG. 1.

In reference now to FIGS. 1 and 4, the oil pressure tank 9 is cylindrically shaped and is placed horizontally. The oil pressure tank 9 contains an oil compression disk 12 that is urged by a compression spring 10 so that the oil 11 is always kept compressed by the disk 12 and free of air bubbles or air pockets in the tank 9.

Figure 5:
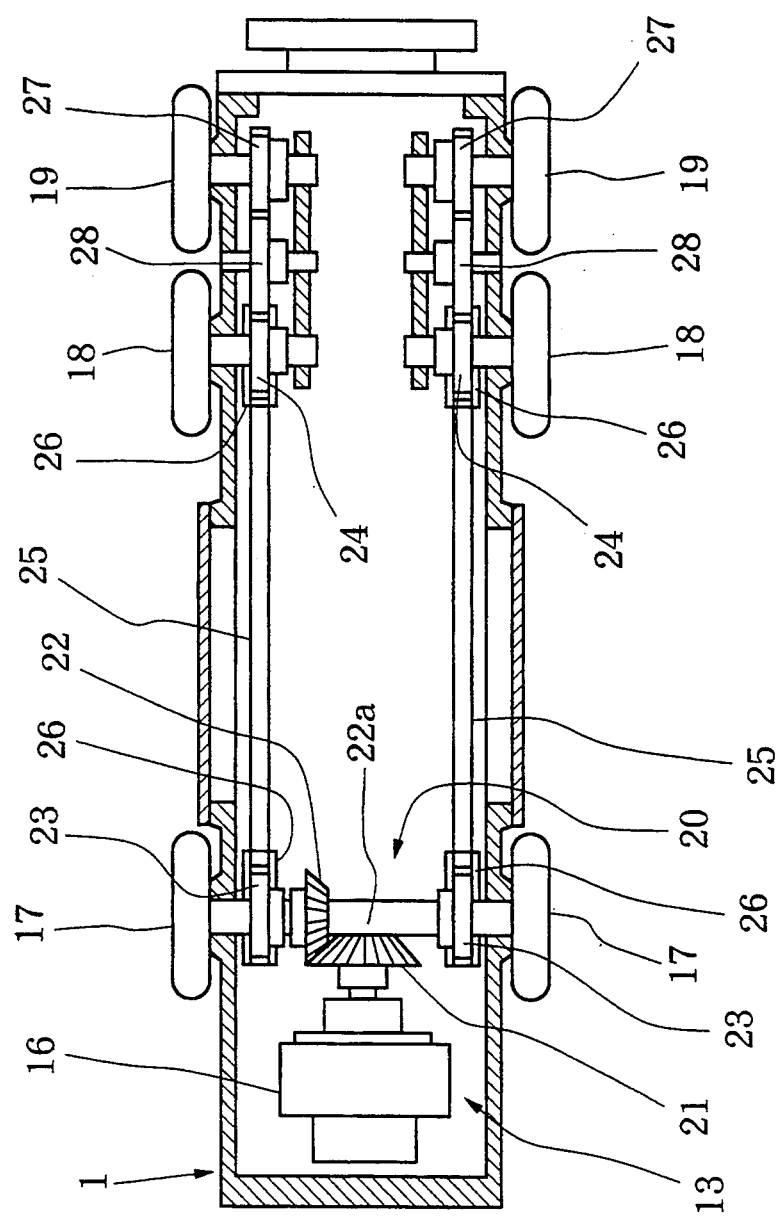
FIG. 5 is a partially sectional plan view of the work vehicle shown in FIG. 1, particularly showing a mobile mechanism of the work vehicle.
Figure 6:
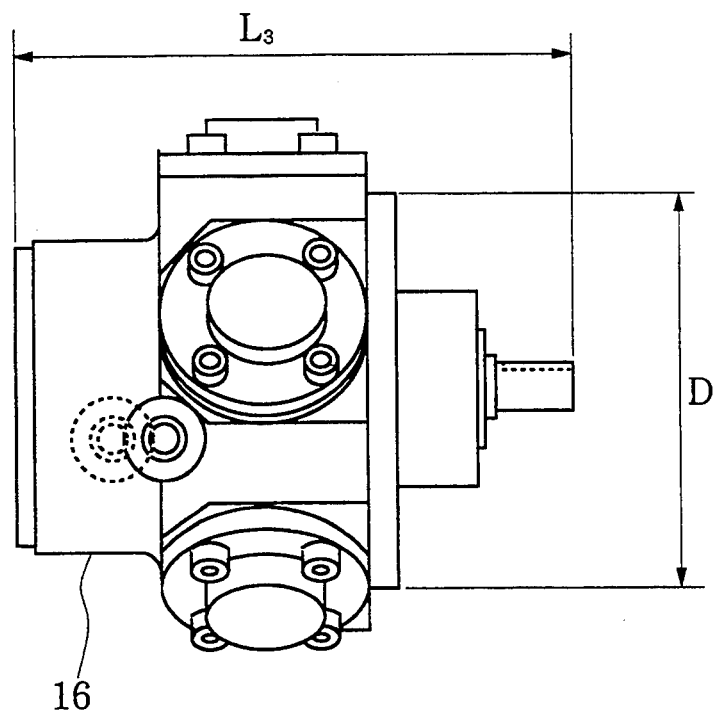
FIG. 6 is a detailed side view of a bi-directional hydraulic motor used in the mobile mechanism of the work vehicle shown in FIG. 1.
Figure 7:
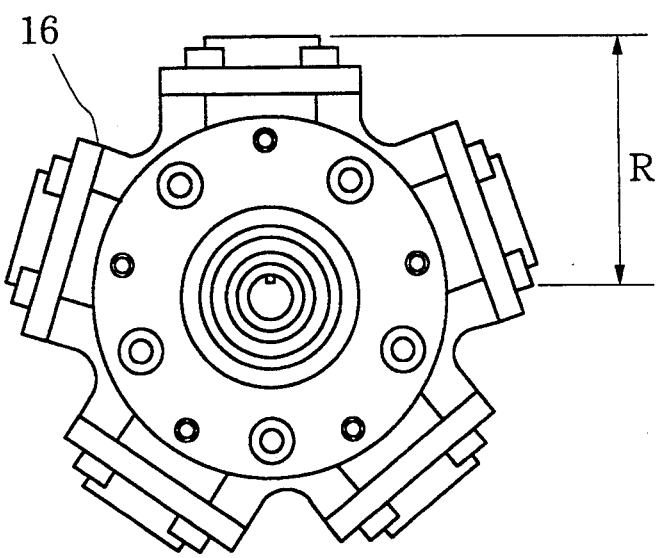
FIG. 7 is a front view of the hydraulic motor shown in FIG. 6.

In reference to FIGS. 1 and 5, the system driving unit 4 includes a mobile mechanism 13, a vehicle anchoring press 14 and a tool actuating mechanism 15. The mobile mechanism 13 has a vehicle driving bi-directional hydraulic motor 16, a pair of rear wheels 17, pairs of first and second front wheels 18, 19, respectively, and a transmission gear train 20 that driveably connect the hydraulic motor 16 with the wheels 17, 18, 19. As shown in FIGS. 6 and 7, the vehicle driving hydraulic motor 16 has five piston-cylinders that are radially arranged about the longitudinal axis of the motor 16 at an even angular pitch, so that the pistons directly drive the crank of the hydraulic motor 16. The total length $L_3$, the flange diameter D and the dimension R from the center of the axis to the top of the cylinder are as small as about 90 mm, 60 mm and 40 mm, respectively.

As shown in FIG. 5, the transmission gear train 20 has a first bevel gear 21 fixedly mounted on the output shaft of the hydraulic motor 16, a second bevel gear 22, which is fixedly mounted on a drive axle 22a of a pair of rear wheels 17 and is meshed with the first bevel gear 21, a pair of worm gears 23 fixedly mounted on the drive axle 22a, a pair of front worm gears 24 mounted on the respective front drive axles of the pair of first front wheels 18, a pair of transmission shafts 25 each having worm gears 26 at its each end, which respectively engage with the worm gears 23 and 24, a pair of gears 27 mounted on the respective drive axles of the pair of second front wheels 19, and a pair of intermediate idler gears 28, which respectively mesh with the worm gears 24 and the gears 27.

Figure 8:
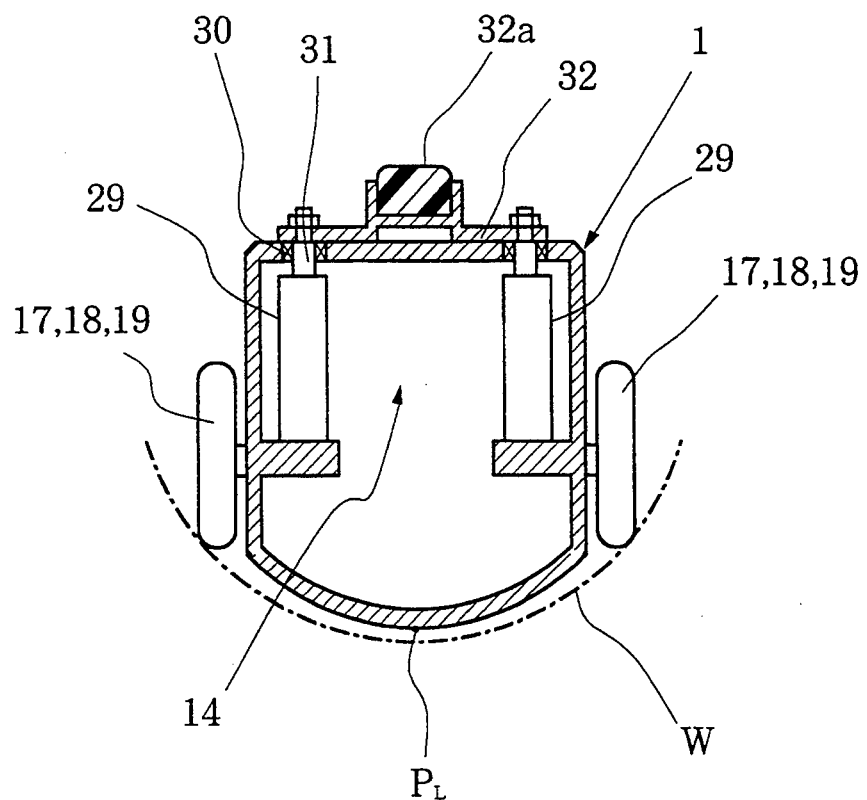
FIG. 8 is a partially sectional front elevational view showing a housing, wheels and a vehicle anchoring mechanism of the work vehicle shown in FIG. 1.

Referring now to FIGS. 1 and 8, the vehicle anchoring press 14 has a pair of oil cylinders 29, each disposed on each side in the housing 2, a pair of seals 30, a pair of piston rods 31 that can be upwardly extended through the respective seals 30, a press pad holder 32 fixedly mounted on the tops of the piston rods 31, and a press pad 32a made of synthetic resin and attached onto the press pad holder 32. The piston rods 31, the press pad holder 32 and the press pad 32a jointly constitute an actuating member of the vehicle anchoring press 14.

Still referring to FIG. 8, the wheels 17, 18, 19 are disposed on the sides of the housing 2 in a manner that the lowest points of the wheels 17, 18, 19, which touch an inside wall W of the pipe, are located at a higher level than the level of the lowest point $P_L$ of the housing 2. This arrangement causes to position the center of mass of the work vehicle 1 substantially low with respect to the level where the wheels 17, 18, 19 are supported by the pipe wall, so that the work vehicle 1 can be stably operated in the pipe.

Figure 9:
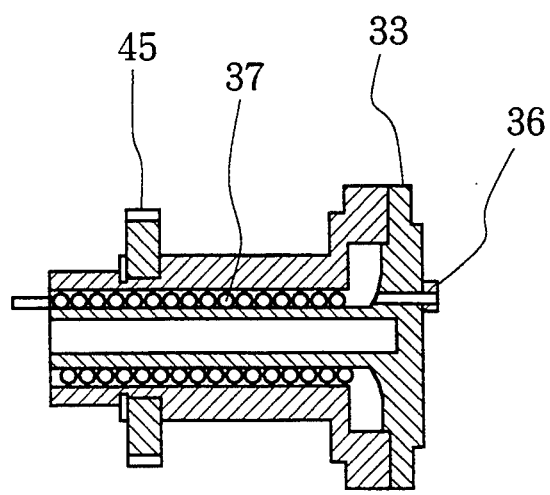
FIG. 9 is a sectional view showing a rotatable tool mount with a coiled oil supply hose used in the work vehicle shown in FIG. 1.
Figure 10:
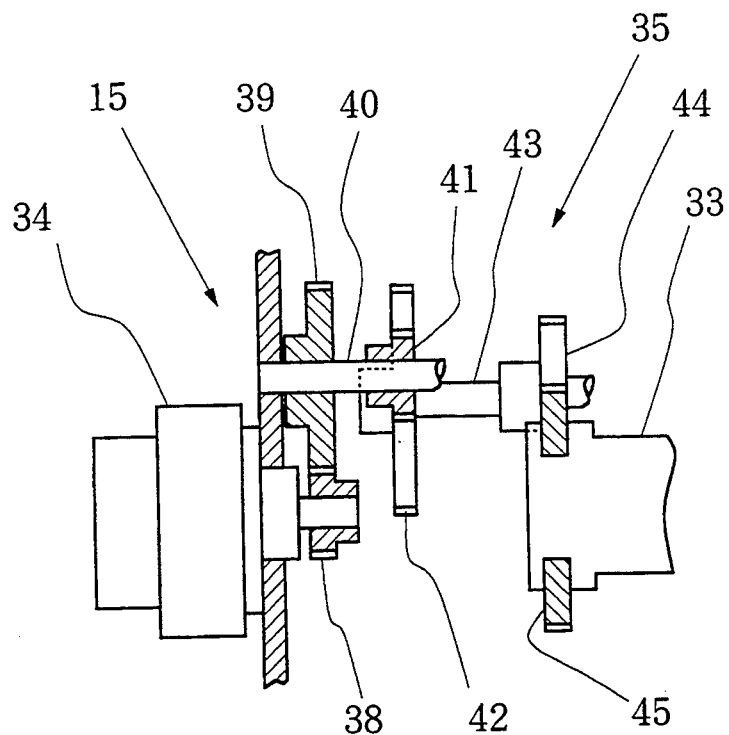
FIG. 10 is a partially sectional side view of a tool actuating mechanism, including the rotatable tool mount, employed in the work vehicle shown in FIG. 1.
Figure 11:
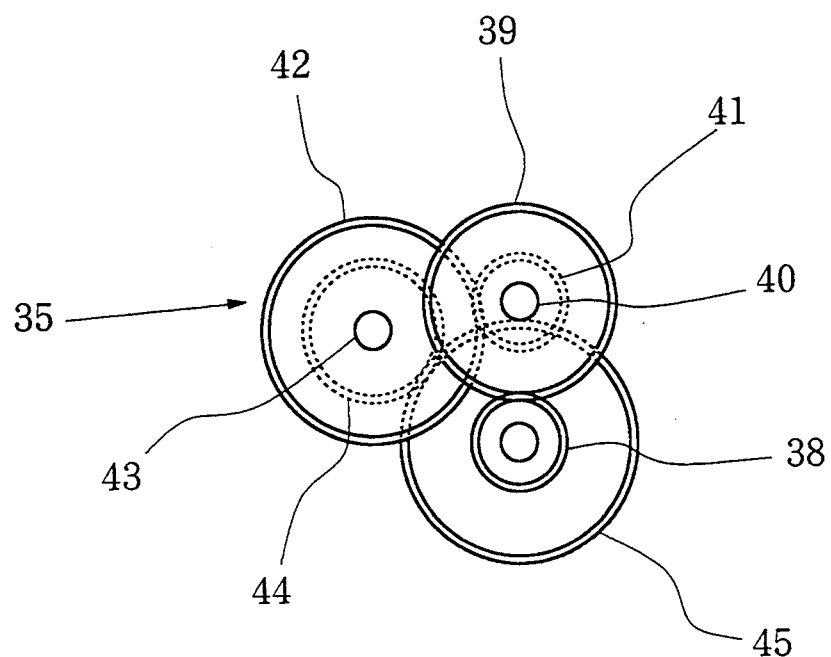
FIG. 11 is a diagrammatic front view of a transmission gear train of the tool actuating mechanism shown in FIG. 10.

Referring back to FIG. 1, the tool actuating mechanism 15 is disposed in a front section of the housing 2. The tool actuating mechanism 15 includes a bi-directionally rotatable tool mount 33, on which a TV camera or work tool can be mounted, a second bi-directional hydraulic motor 34 and a second transmission gear train 35 that driveably connect the tool mount 33 with the second hydraulic motor 34. As shown in FIG. 9, the tool mount 33 accommodates therein a coiled oil pressure hose 37. As shown in FIGS. 10 and 11, the second transmission gear train 35 includes a gear 38, which is fixedly mounted on the output shaft of the second hydraulic motor 34, a gear 39, which meshes with the gear 38, a gear 41, which is affixed to a rotational shaft 40 of the gear 39, a gear 42, which meshes with the gear 41, a gear 44, which is affixed to the rotational axis of the gear 42, and a gear 45, which is coaxially affixed to the tool mount 33 and meshes with the gear 44.

The oil flow control valve block 5 regulates the supplies and flow directions of the oil supplied from the oil pressure generating unit 3 to the driving unit 4. As shown in FIG. 12, the oil flow control valve block 5 includes a high pressure relief valve 46, a low pressure relief valve 47, a vehicle driving control valve 481, a vehicle anchoring control valve 482, a tool mount rotating control valve 483 and a tool actuating control valve 484. As shown in FIG. 13, for example, each of the control valves 481, 482, 483 and 484, consists of a dual-solenoid four-way valve unit having a pair of solenoids 485 and 486. All of the relief valves 46, 47 and the control valves 481, 482, 483, 484 are, as shown in FIGS. 12 and 14, disposed side-by-side in a row. As shown in FIGS. 13 and 14, each of the relief valves 46, 47 and the control valves 481, 482, 483, 484 has an oil supply passage 488 having an oil supply port P and an oil return passage 489 having a tank port T. As shown in FIG. 14, all of the oil supply passages 488 of all of the relief valves 46, 47 and the control valves 481, 482, 483, 484 are communicated with each other through seal rings 490 that are placed between adjacent valves, making an extended common straight through-passage 488c. Similarly, all of the oil return passages 489 of all of the relief valves 46, 47 and the control valves 481, 482, 483, 484 are communicated with each other, making an extended common straight oil return passage 489c. The driving oil supplied from the oil pressure pump 3 is received into the common oil supply passage 488c, and the driving oil is returned from the common oil return passage 489c to the oil tank 9.

Now, the operation of the self-mobile work vehicle 1 will be explained in the case, for example, the vehicle 1 is moved through an underground pipe 51, as shown in FIG. 15.

First, the vehicle 1 is placed into the pipe 51 through, for example, a man-hole (not shown) and the electric cable 6, which is connected to the rear of the vehicle 1, is connected to an outside power supply (not shown) and an outside control unit (not shown). By operating the outside control unit, the electric motor 7 is turned on so as to drive the oil pressure pump 8. By turning on the vehicle driving control valve 481, the driving oil pressurized by the pump 8 is introduced to the hydraulic motor 16 so as to drive the motor 16. Then, the driving power of the motor 16 is transmitted to all of the wheels 17, 18, 19 via the transmission gear train 20, so that the vehicle 1 is moved along the inside wall of the pipe 51. In moving the vehicle 1, each of the wheels 17, 18, 19 is given an independent driving force, and the driving force is generated by means of oil pressure. Therefore, each wheel is given a sufficiently large torque so as to overcome any irregular or adverse conditions in the pipe 51, such as misalignment or dislocation of pipe joints, any deposit of foreign material, any curvature or a sloped section 511 of the pipe 51, as illustrated in FIG. 15.

Furthermore, when the vehicle 1 is moved through the sloped section 511 or a curved section, since the horizontally disposed cylindrical oil tank 9 employs the disk 12 that is urged by the compression spring 10 so as to always compress the oil 11, no air bubbles will be produced in the oil 11, and the oil 11 is supplied to the hydraulic motor 16 through the oil pressure pump 3 and the vehicle driving control valve 481 in a stable state.

After the vehicle 1 has been moved to a desired work site, the vehicle 1 is stopped by turning off the vehicle driving control valve 481. Since the distance between the vehicle driving control valve 481 and the hydraulic motor 16 is very short, the hydraulic motor 16 can be stopped with little time delay after the vehicle driving control valve 481 has been turned off. Therefore, the vehicle 1 can be stopped at precisely the desired position in the pipe.

Reference is now made to FIGS. 1, 5, 8 and 15. After the vehicle 1 has been stopped at the desired position, the vehicle anchoring control valve 482 is turned on, and the driving oil of a predetermined pressure is supplied to the pair of oil cylinders 29 of the vehicle anchoring press 14 disposed in the middle section of the vehicle 1 so that the piston rods 31 are raised. As the piston rods 31 are raised, the press pad 32a on the press pad holder 32 is pressed against the inside wall of the pipe 51, whereby the vehicle 1 is self-clamped between the press pad 32a and the wheels 17, 18, 19 and securely anchored in the pipe 51. Thus, the vehicle 1 is fixed at the desired position in the pipe 51 without any possibility of accidental slippage or movement.

Reference is again made to FIGS. 1, 12 and 13. After the vehicle 1 has been positioned and anchored at the desired position, the tool mount rotating control valve 483 is turned on so that the driving oil 11 is supplied to the second hydraulic motor 34 of the tool actuating mechanism 15, thereby rotating the hydraulic motor 34. The rotational power of the hydraulic motor 34 is then transmitted to the tool mount 33 via the second transmission gear train 35, so that the tool mount 33 is rotated. On the tool mount 33 is fixedly mounted a work tool 50. While the tool mount 33 is turning, the work tool 50 is positioned at a desired work angle. Then, the tool mount rotating control valve 483 is turned off so as to stop the rotation of the hydraulic motor 34. Also in this case, since the hydraulic motor 34 can be instantly stopped responsive to the operation of the tool mount rotating control valve 483, the work tool 50 can be positioned precisely at the desired angle.

Furthermore, since the oil pressure hose 37, through which the driving oil 11 is provided to the work tool 50, is accommodated in the tool mount 33 in a coiled form, the oil pressure hose 37 will not be twisted, kinked or otherwise disshaped when the tool mount 33 is rotated.

After the work tool is precisely positioned at the desired position, the tool actuating control valve 484 is turned on so that the driving oil 11 of a predetermined pressure is supplied to a hydraulic cylinder or a hydraulic motor (not shown) of the work tool 50 and a predetermined work, such as inspection or repair, is performed by the work tool 50. Since the driving oil 11, which drives the work tool 50, is not highly compressive, the work can be performed quickly and with sufficient amount of power. In addition, by utilizing a hydraulic power, a danger of electrical short circuit can be minimized and a high work efficiency can be maintained even under an adverse condition where the vehicle 1 is subjected to mud or water.

After the work has been completed, the tool actuating control valve 484 is reversed so that the oil flow to the hydraulic cylinder or the hydraulic motor of the work tool 50 is reversed. Then, the vehicle anchoring control valve 482 is reversed so that the oil flow to the pair of oil cylinders 29 of the vehicle anchoring press 14 is also reversed, so that the pair of piston rods 31 are retracted, and the vehicle 1 is thereby freed from being anchored. Thereafter, the vehicle driving control valve 481 is again turned on so that the driving oil 11 is supplied to the hydraulic motor 16 so as to move the vehicle to the next work location, and the operational sequence mentioned above is repeated.

Next, an operation of lining an inside wall of a branch pipe that interconnects with the main pipe 51 by using a lining apparatus with the work vehicle 1 will be explained.

FIG. 16 shows one embodiment of a part of a lining apparatus 60 for lining an inside wall of a branch pipe. The lining apparatus 60 in FIG. 16 shows the work vehicle 1 and a part of the lining equipment 61 that is fixedly mounted on the tool mount 33 on the front side of the vehicle 1. Referring to FIGS. 16 and 17, the lining equipment 61 includes a holding bracket 62, which is fixedly mounted on the tool mount 33 of the work vehicle 1, a lining material anchoring hydraulic press 74, which is fixedly mounted on the holding bracket 62, a lining tool holder 64 fixedly mounted on the lining material anchoring hydraulic press 74, a counter hydraulic press 76 fixedly mounted on the holding bracket 62, and a sealing part 65. The lining tool holder 64 has an upwardly convex arcuate press plate 66, which has a circular guide hole 67 in the middle part thereof, a curved guide tube 68 downwardly extending from the periphery of the guide hole 67, and a bottom supporting frame 64a. The curvature of the arcuate press plate 66 matches the curvature of the inside wall of the main pipe, and the diameter of the guide hole 67 matches the inside diameter of the branch pipe.

As shown in FIG. 17, the sealing part 65 has an enclosure tube 70, one end 70a of which is open and is sealedly fastened to the lower end of the guide tube 68 by fasteners 69, and a water stemming plate 71 that is sealedly attached to the other end 70b of the enclosure tube 70 so that the end 70b of the enclosure tube 70 is closed. A fluid supply hose 72 together with an electric cable 72a and a fluid draining hose 73 are connected to the water stemming plate 71 in a manner that the ends of the hose 72 with the electric cable 72a and the hose 73 are extended into the interior of the enclosure tube 70 through a pair of holes 71a, 71b, respectively, of the water stemming plate 71.

As shown in FIG. 18, the lining material anchoring hydraulic press 74 is a dual-cylinder/rod hydraulic cylinder assembly having a pair of cylinders 74a, 74b and a top pair and a bottom pair of piston rods 741 and 742, respectively. The top and the bottom piston rods 741, 742 have respective common pistons so that all the rods 741 and 742 always move in the same direction simultaneously. The ends of the rods 741 and the ends of the rods 742 are connected to the arcuate press plate 66 and the bottom supporting frame 64a, respectively, of the lining tool holder 64, so that the entire lining tool holder 64 is moved together with the rods 741, 742 when the driving oil is supplied into, or released from, the cylinders 74a, 74b. Namely, the rods 741, 742 jointly constitute an actuating member of the lining material anchoring hydraulic press 74. The hydraulic press 74 is positioned in a manner that the rods 741, 742 are extendable or moveable in a direction perpendicular to a longitudinal center axis of the pipe in which the lining apparatus 60 is disposed.

The counter hydraulic press 76 has a rod 75 as its actuating member. The counter hydraulic press 75 is intended to press against the wall of the pipe 51 in the direction opposite to direction of the pressing force by the press plate 66 in order to secure the lining equipment 61 in position in the pipe 51. Therefore, the rod 75 of the counter hydraulic press 76 is always extended in a direction perpendicular to the longitudinal center axis of the pipe 51 but in the direction opposite to the direction of the extension of the rods 741, 742 of the lining material anchoring hydraulic press 74.

Next, an operation for lining a lining material onto the inside wall of a branch pipe, which interconnects with a main pipe, will be explained.

Referring to FIG. 19, numeral 84 denotes a lining material that includes a tubular part 83, having a first end 83a and a second end 83b, and a flange 82 attached to the periphery of a hole 81 at the first end 83a. The lining material 84 is made of a fabric, such as felt, coated or impregnated with thermosetting synthetic resin.

Referring to FIG. 20, numeral 87 denotes a sealing tube having an open end 87a and a closed end 87b. The sealing tube 87 is made of a flexible heat-resistive synthetic resin sheet and is generally formed like an elongated bag. The sealing tube 87 has an electrical heating element 85 imbedded therein in the proximity of the open end 87a and electrical lead wires 86 connected to the heating element 85 and extending out from the closed end 87b.

Referring now to FIG. 21, numeral 80 denotes a lining material unit that consists of the above mentioned lining material 84 and the sealing tube 87. The open end 87a of the sealing tube 87 is sealedly bonded to the second end 83b of the tubular part 83 of the lining material 84 by a rubber-based adhesive 88, such as a chloroprene-based adhesive or a nitrile rubber adhesive, having a low melting temperature of approximately 70° C. to 80° C.

The tubular part 83 of the lining material unit 80 is inserted into the guide tube 68 of the lining tool holder 64 and the enclosure tube 70 of the sealing part 65 through the guide hole 67 of the lining tool holder 64 in a manner that the flange 82 is placed on the arcuate press plate 66. Thereafter, the fluid supply hose 72 with the electric cable 72a and the fluid draining hose 73 are inserted into the enclosure tube 70 through the holes 71a, 71b, respectively, of the water stemming plate 71, and the lead wires 86 extending out from the sealing tube 87 are electrically connected to the electric cable 72a. Then, the open end of the enclosure tube 70 is attached to the lower end of the guide tube 68 of the lining tool holder 64, and the open end of the enclosure tube 70 is securely held and sealed by fasteners 69.

Subsequently, the vehicle 1 with the lining equipment mounted thereon is moved to a predetermined work site and is securely anchored according to the procedures mentioned above.

Thereafter, the driving oil is supplied to the hydraulic motor 34 through the tool mount rotating control valve 483 so as to align the guide hole 67 of the arcuate press plate 66, on which the flange 82 is placed, with the mouth of the branch pipe 54 where the branch pipe 54 is connected to the main pipe 51 while observing the position by an observation device such as a TV camera (not shown) mounted on the work vehicle 1.

After the guide hole 67 of the arcuate press plate 66 has been precisely aligned with the mouth of the branch pipe 54, the driving oil is simultaneously supplied to both the counter hydraulic press 76 and the lining material anchoring hydraulic press 74 of the lining equipment 61 by operating the tool actuating control valve 484 through the oil pressure hose 37 accommodated in the tool mount 33. While the driving oil is supplied to the counter hydraulic press 76 and the hydraulic press 74, since the hydraulic press 74 is subjected to the weights of the lining tool holder 64, the lining material 80, etc., only the rod 75 of the counter hydraulic press 76 starts to extend first. After the rod 75 of the counter hydraulic press 76 has reached the inside wall of the main pipe 52, the pressure of the oil supplied to the hydraulic press 74 overcomes the weights of the lining tool holder 64, the lining material 80, etc. Then, the hydraulic press 74 also starts to actuate and the entire lining tool holder 64 is pushed by the rods 741 of the hydraulic press 74 toward the wall of the main pipe 52. Consequently, the flange 82 on the press plate 66 of the lining tool holder 64 is pressed against the inside wall of the main pipe 52 around the mouth of the branch pipe 54. Since the counter hydraulic press 76 is simultaneously pressing the inside wall of the main pipe 52 in the opposite direction, the flange 82 can be pressed against the wall by the press plate 66 with a sufficient pressing force and is securely attached thereto. FIG. 22 shows the flange 82 having been securely attached to the inside wall of the main pipe 52. In FIG. 22, numeral 53 denotes a tubular synthetic resin which is lined to the inside wall of the main pipe 52.

Under this state, the flow path of the fluid draining hose 73 is shut off, and a pressurized fluid such as pressurized air is supplied into the sealing part 65 via the fluid supply hose 72. As the pressurized fluid is kept supplied into the sealing part 65, the tubular part 83 of the lining material 84 is, as shown in FIG. 22, gradually turned inside out and is forced into the branch pipe 54 by the pressurized fluid. The tubular part 83 inserted to the branch pipe 54 inside out is pressed against the inside wall of the branch pipe 54 by the fluid pressure. As the pressurized fluid is further supplied into the sealing part 65, the sealing tube 87 is, as shown in FIG. 23, also inserted into the branch pipe 54 and turned inside out therein. After the entirety of the tubular part 83 has been pressed against the inside wall of the branch pipe 54 and the sealing tube 87 has been turned inside out therein, a heated pressurized fluid, such as heated air, hot water or steam, is supplied into the sealing part 65 and circulated therethrough through the hoses 72 and 73 for a predetermined time period. As the circulation of the heated pressurized fluid continues, the thermosetting resin contained in the flange 82 and the tubular part 83 of the lining material 84 are thermally set hardened by the heat of the circulating heated pressurized fluid. Thus, a layer of lining, which is tightly attached to the inside wall of the branch pipe 54, is formed.

Reference is now made to FIGS. 20 and 23. After the heated pressurized fluid has been provided for the predetermined time, the interior of the guide tube 68 and the sealing part 65 is depressurized to a normal environmental pressure. Subsequently, electric current id provided to the heating element 85 imbedded in the sealing tube 87 via the electric cable 72a and the lead wires 86 in order to melt the adhesive 88, which bonds the tubular part 83 and the sealing tube 87 each other, by the heat generated from the heating element 85. Then, the hose 72 and the electric cable 72a are pulled from outside so that the sealing tube 87 is separated from the tubular part 83, and only the tubular part 83 remains on the inside wall of the branch pipe 54.

After the sealing tube 87 has been separated from the tubular part 83, by switching the tool actuating control valve 484, the flow direction of the driving oil supplied to the hydraulic press 74 and the counter hydraulic press 76 is reversed, so that the rods 741 and 75 of the hydraulic press 74 and the counter hydraulic press 76, respectively, are retracted and, consequently, the lining tool holder 64 is also retracted and the press plate 66 is separated from the flange 82. Thereafter, the piston rods 31 of the vehicle anchoring press 14 (FIGS. 8, 16) are lowered to release the work vehicle 1, and the vehicle 1 is moved to a next work position.

In the above explained embodiment of the lining equipment 61, the cylinders of the counter hydraulic press 76 and the lining material anchoring hydraulic press 74 are installed in parallel with each other, and the pressing forces by the two presses 76, 74 are exerted in the opposite directions from each other.

FIGS. 24, 25 and 26 show an alternative construction of a part of the lining equipment 61. As shown in FIGS. 24, 25 and 26, the alternative construction includes a dual-cylinder lining material anchoring hydraulic press 74A pivotally connected to a holding bracket 62A, pairs of linking arms 77 and 78 pivotally connected to the holding bracket 62A, a counter hydraulic press 76A pivotally mounted on the holding bracket 62A (FIG. 26), and a counter press arm 79 having a pressing head 75A pivotally connected to the holding bracket 62A. In this embodiment, the lining tool holder 64 is pivotally supported by the linking arms 77, 78 at their top ends 77a, 78a in a manner that the lining tool holder 64 is raised by the linking arms 77 when the linking arms 77 are pivotingly moved up by being pushed up by the hydraulic press 74A.

It will be understood that various changes and modifications may be made in the above described embodiments which provide the characteristics of the present invention without departing from the spirit and principle thereof particularly as defined in the following claims.

What is claimed is:

1. A lining equipment for lining a branch pipe that interconnects with a main pipe, including
   (a) a tubular flexible lining material including a tubular part having a first end and a second end, said lining material being made of a fabric coated or impregnated with a thermosetting synthetic resin and having a flange at said first end of said tubular part, said flange of said tubular flexible lining material being pressedly held against an inside wall of the main pipe in a manner that said first end of said tubular part is aligned with a mouth of the branch pipe where the branch pipe is connected to the main pipe,
   (b) a sealing tube having an open end and a closed end, said sealing tube having an electric heater element imbedded therein in the proximity of said open end thereof, said open end being sealedly bonded to said second end of said tubular part of said lining material by a bonding agent that can be melted by heat generated from said electric heater element, (c) means for inserting said tubular part of said tubular lining material together with said sealing tube attached thereto into the branch pipe through the mouth of the branch pipe in a manner that said tubular part of said tubular flexible lining material and said sealing tube are turned inside out in the branch pipe and further said tubular part of said lining material is pressed against an inside wall of the branch pipe, (d) means for heating said tubular part of said tubular lining material, which has been pressed against the inside wall of the branch pipe, so that said thermosetting synthetic resin coated or impregnated in said tubular part is set hardened, and (e) means for providing electric current to said electric heater element in order to melt said bonding agent so that said sealing tube is separated from said tubular part.

2. A self-mobile lining apparatus moveable in a main pipe of a pipeline system for lining a branch pipe that interconnects with the main pipe, the lining apparatus comprising:

(1) a self-mobile vehicle having wheels and moveable in the main pipe, including
  (a) a vehicle anchoring mechanism, said vehicle anchoring mechanism being a first hydraulic press having a first actuating member that can be upwardly extended and pressed against an inside wall of the main pipe so that the work vehicle is self-clamped by and between said first actuating member and said wheels, and
  (b) a tool actuating mechanism for rotating and actuating a work tool, said tool actuating mechanism including
    a tool mount disposed at a front of the work vehicle, said tool mount being bi-directionally rotatable about an imaginary rotating axis that is parallel with a longitudinal center axis of the main pipe; and (2) a lining equipment, including
  (a) a mounting bracket fixedly mounted on said rotatable tool mount,
  (b) a second hydraulic press having a second actuating member, said second hydraulic press fixedly mounted on said mounting bracket, said second actuating member being extendable in a direction perpendicular to a longitudinal center axis of the main pipe,
  (c) a counter hydraulic press having a counter actuating member, said counter hydraulic press fixedly mounted on said mounting bracket, said counter actuating member being extendable in a direction perpendicular to the longitudinal center axis of the main pipe but in a direction opposite to the direction of the extension of said second actuating member,
  (d) a lining tool holder fixedly mounted on said second actuating member so that the entirety of said lining tool holder can be moved with a movement of said second actuating member, said lining tool holder having
    an arcuate press plate having a curvature that matches the curvature of the inside wall of the main pipe, said arcuate press plate having a circular guide hole whose diameter matches the inside diameter of the branch pipe,
  (e) a tubular flexible lining material including a tubular part having a first end and a second end, said lining material being made of a fabric coated or impregnated with a thermosetting synthetic resin and having a flange at said first end of said tubular part, said flange of said tubular flexible lining material being pressedly interposed between said arcuate press plate and the inside wall of the main pipe in a manner that said guide hole of said arcuate press plate is aligned with a mouth of the branch pipe where the branch pipe is connected to the main pipe,
  (f) a sealing tube having an open end and a closed end, said sealing tube having an electric heater element imbedded therein in the proximity of said open end thereof, said open end being sealedly bonded to said second end of said tubular part of said lining material by a bonding agent that can be melted by heat generated from said electric heater element,
  (g) means for inserting said tubular part of said tubular lining material together with said sealing tube attached thereto into the branch pipe through the mouth of the branch pipe by a pressurized fluid in a manner that said tubular part of said tubular flexible lining material and said sealing tube are turned inside out in the branch pipe and further said tubular part of said lining material is pressed against an inside wall of the branch pipe,
  (h) means for heating said tubular part of said tubular lining material, which has been pressed against the inside wall of the branch pipe, by a heated pressurized fluid so that said thermosetting synthetic resin coated or impregnated in said tubular part is set hardened, and
  (i) means for providing electric current to said electric heater element in order to melt said bonding agent so that said sealing tube is separated from said tubular part.

3. A self-mobile lining apparatus moveable in a main pipe of a pipeline system for lining a branch pipe that interconnects with the main pipe, the lining apparatus comprising:

(1) a self-mobile vehicle moveable in the main pipe, including
  (a) a housing,
  (b) an oil pressure generating unit, including
    an electric motor,
    an oil pressure pump driven by said electric motor, and
    an oil tank for providing a driving oil to said oil pressure pump,
  (c) a system driving unit, including
    a mobile mechanism for moving the work vehicle through the main pipe, said mobile mechanism including
      a first bi-directional hydraulic motor,
      a first transmission gear train, and plural pairs of wheels bi-directionally driven by said first bi-directional hydraulic motor via said first transmission gear train, said wheels being disposed on sides of said housing in a manner that the lowest points of said wheels are located at a higher level than the level of the lowest point of said housing,
    a vehicle anchoring mechanism, said vehicle anchoring mechanism being a first hydraulic press having a first actuating member that can be upwardly extended and pressed against an inside wall of the main pipe so that the work vehicle is self-clamped by and between said first actuating member and said wheels, and a tool actuating mechanism for rotating and actuating a work tool, said tool actuating mechanism including a second bi-directional hydraulic motor, a second transmission gear train, and a rotatable tool mount disposed at a front of the work vehicle, said tool mount being bi-directionally rotated by said second bi-directional hydraulic motor via said second transmission gear train about an imaginary rotating axis that is parallel with a longitudinal center axis of the main pipe, and (d) an oil flow control valve block, including a plurality of solenoid-operated oil flow control valves for controlling supplies and flow directions of the driving oil provided by said oil pressure pump to any of said first bi-directional hydraulic motor, said first hydraulic press and said second bi-directional hydraulic motor individually and selectively; and (2) a lining equipment, including (a) a mounting bracket fixedly mounted on said rotatable tool mount, (b) a second hydraulic press having a second actuating member, said second hydraulic press fixedly mounted on said mounting bracket, said second actuating member being extendable in a direction perpendicular to a longitudinal center axis of the main pipe, (c) a counter hydraulic press having a counter actuating member, said counter hydraulic press fixedly mounted on said mounting bracket, said counter actuating member being extendable in a direction perpendicular to the longitudinal center axis of the main pipe but in a direction opposite to the direction of the extension of said second actuating member, (d) a lining tool holder fixedly mounted on said second actuating member so that the entirety of said lining tool holder can be moved with a movement of said second actuating member, said lining tool holder having an arcuate press plate having a curvature that matches the curvature of the inside wall of the main pipe, said arcuate press plate having a circular guide hole whose diameter matches the inside diameter of the branch pipe, and a guide tube having a first end and a second end, said first end of said guide tube being fixedly and sealedly connected to said arcuate press plate in a manner that said guide hole of said arcuate press plate is encircled by the periphery of said first end of said guide tube, (e) a generally tubular sealing part having an open end and a closed end, said open end of said sealing part being sealedly attached to said second end of said guide tube so that said sealing part and said guide tube are internally communicated with each other, (f) a tubular flexible lining material including a tubular part having a first end and a second end, said lining material being made of a fabric coated or impregnated with a thermosetting synthetic resin and having a flange at said first end of said tubular part, (g) a sealing tube having an open end and a closed end, said sealing tube having an electric heater element imbedded therein in the proximity of said open end thereof, said open end being sealedly bonded to said second end of said tubular part of said lining material by a bonding agent that can be melted by heat generated from said electric heater element, said tubular part of said tubular flexible lining material together with said sealing tube attached thereto being inserted into said guide tube and sealing part attached thereto through said guide hole of said arcuate press plate and said flange of said tubular flexible lining material being pressedly interposed between said arcuate press plate and the inside wall of the main pipe in a manner that said guide hole of said arcuate press plate is aligned with a mouth of the branch pipe where the branch pipe is connected to the main pipe;

(h) means for supplying a pressurized fluid into a space enclosed by said guide tube and said sealing part so that said pressurized fluid causes to force said tubular part of said tubular lining material together with said sealing tube into the branch pipe and are turned inside out in the branch pipe and further press said tubular part of said lining material against an inside wall of the branch pipe, (i) means for supplying a heated pressurized fluid into said space enclosed by said guide tube and said sealing part so that the heated pressurized fluid causes said thermosetting synthetic resin coated or impregnated in said tubular part, which has been pressed against the inside wall of the branch pipe, to be set hardened, and (j) means for providing electric current to said electric heater element in order to melt said bonding agent so that said sealing tube is separated from said tubular part.

4. A method of lining an inside wall of a branch pipe that interconnects with a main pipe of a pipeline system, the method including the steps of:

(a) preparing a lining tool holder, said lining tool holder including an arcuate press plate having a circular guide hole and a guide tube having a first end and a second end, said arcuate press plate having a curvature that matches the curvature of an inside wall of the main pipe, the diameter of said guide hole matching the inside diameter of the branch pipe, said first end of said guide tube being fixedly and sealedly connected to said arcuate press plate in a manner that said guide hole of said arcuate press plate is encircled by the periphery of said first end of said guide tube;

(b) preparing a generally tubular sealing part having an open end and a closed end;

(c) preparing a tubular flexible lining material including a tubular part having a first end and a second end, said lining material being made of a fabric coated or impregnated with a thermosetting synthetic resin and having a flange at said first end of said tubular part;

(d) preparing a sealing tube having an open end and a closed end, said sealing tube having an electric heater element imbedded therein in the proximity of said open end thereof;

(e) sealingly bonding said open end of said sealing tube to said second end of said tubular part of said lining material by a bonding agent that can be melted by heat generated from said electric heater element;

(f) inserting said tubular part of said tubular flexible lining material together with said sealing tube attached thereto into said guide tube and sealing part through said guide hole of said arcuate press plate in a manner that said flange of said tubular flexible lining material is placed on said arcuate press plate;

(g) sealingly attaching said open end of said sealing part to said second end of said guide tube so that said sealing part and said guide tube are internally communicated with each other;

(h) positioning said arcuate press plate together with said flange placed thereon in a manner that said guide hole of said arcuate press plate opposes a mouth of the branch pipe where the branch pipe is connected to the main pipe;

(i) pressing said arcuate press plate against the inside wall of the main pipe by a press so that said flange of said lining material is pressedly interposed between the inside wall of the main pipe and said arcuate press plate;

(j) supplying a pressurized fluid into a space enclosed by said guide tube and said sealing part so that said pressurized fluid causes to force said tubular lining material together with said sealing tube into the branch pipe, whereby said tubular part of said lining material and said sealing tube are turned inside out in the branch pipe and, further, said tubular part of said lining material is pressed against an inside wall of the branch pipe;

(k) supplying a heated pressurized fluid into said space enclosed by said guide tube and said sealing part so that the heated pressurized fluid causes said thermosetting synthetic resin coated or impregnated in said tubular part, which has been pressed against the inside wall of the branch pipe, to be set hardened; and (l) providing electric current to said electric heater element in order to melt said bonding agent by the heat generated from the heater element so that said sealing tube is separated from said tubular part.

* * * * *